(12) United States Patent
Chang et al.

(10) Patent No.: US 8,139,891 B2
(45) Date of Patent: Mar. 20, 2012

(54) SYSTEM AND METHOD FOR STRUCTURE ENHANCEMENT AND NOISE REDUCTION IN MEDICAL IMAGES

(75) Inventors: Ti-chiun Chang, Princeton Junction, NJ (US); Yunqiang Chen, Plainsboro, NJ (US); Tong Fang, Morganville, NJ (US); Jason Jenn-Kwei Tyan, Princeton, NJ (US); Gregory G. Slabaugh, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1177 days.

(21) Appl. No.: 11/926,877

(22) Filed: Oct. 29, 2007

(65) Prior Publication Data
US 2008/0107352 A1 May 8, 2008

Related U.S. Application Data

(60) Provisional application No. 60/864,233, filed on Nov. 3, 2006.

(51) Int. Cl.
| | |
|---|---|
| *G06K 9/46* | (2006.01) |
| *G06K 9/66* | (2006.01) |
| *G06K 9/40* | (2006.01) |
| *G06K 9/64* | (2006.01) |
| *G06K 9/36* | (2006.01) |
| *G06K 9/20* | (2006.01) |
| *G06K 1/00* | (2006.01) |
| *H04N 5/228* | (2006.01) |
| *H04N 7/01* | (2006.01) |
| *H04N 11/20* | (2006.01) |
| *H04N 1/40* | (2006.01) |
| *G06F 15/00* | (2006.01) |
| *G03F 3/08* | (2006.01) |

(52) U.S. Cl. ........ 382/274; 382/190; 382/254; 382/278; 382/282; 348/222.1; 348/453; 358/1.2; 358/2.1; 358/448; 358/521

(58) Field of Classification Search .......... 382/128–132, 382/162, 168–169, 173, 181, 190–191, 195, 382/199, 205, 254, 260–266, 270, 275–276, 382/278, 282
See application file for complete search history.

(56) References Cited

U.S. PATENT DOCUMENTS

| | | | | |
|---|---|---|---|---|
| 5,461,655 | A | * | 10/1995 | Vuylsteke et al. ............. 378/62 |
| 5,757,976 | A | | 5/1998 | Shu |
| 5,818,964 | A | | 10/1998 | Itoh |
| 6,173,084 | B1 | * | 1/2001 | Aach et al. .................... 382/260 |
| 6,370,279 | B1 | | 4/2002 | Paik |
| 6,631,162 | B1 | | 10/2003 | Lee et al. |
| 6,754,398 | B1 | * | 6/2004 | Yamada ........................ 382/260 |
| 2002/0071600 | A1 | * | 6/2002 | Yamada ........................ 382/132 |
| 2004/0258325 | A1 | * | 12/2004 | Sasada .......................... 382/275 |
| 2006/0072844 | A1 | * | 4/2006 | Wang et al. .................. 382/254 |
| 2006/0171591 | A1 | * | 8/2006 | Chang et al. ................. 382/190 |

(Continued)

OTHER PUBLICATIONS

Burt, P. J. et al., "the Laplacian Pyramid as a Compact Image Code," IEEE Transactions on Communications, vol. COM-31, No. 4, pp. 532-540, Apr. 1983.

(Continued)

*Primary Examiner* — Anand Bhatnagar
*Assistant Examiner* — Nathan Bloom

(57) ABSTRACT

A method and system for structure enhancement and noise reduction of medical images using adaptive filtering is disclosed. The method utilizes feature estimation methods to determine multiple feature values for each pixel in an input image. Each pixel is then filtered using a filter type selected based on the feature values for that pixel.

21 Claims, 7 Drawing Sheets

U.S. PATENT DOCUMENTS

2007/0071354 A1    3/2007    Florent et al.
2007/0177817 A1*   8/2007    Szeliski et al. ............... 382/275
2007/0183681 A1    8/2007    Li et al.
2007/0217566 A1*   9/2007    Chen et al. ...................... 378/4
2010/0142790 A1*   6/2010    Chang .......................... 382/132

OTHER PUBLICATIONS

Tomasi, C. et al. "Bilateral Filtering for Gray and Color Images," Proceedings of the 1998 IEEE International Conference on Computer vision, Bombay, India 1998.

* cited by examiner

SYSTEM AND METHOD FOR STRUCTURE ENHANCEMENT AND NOISE REDUCTION IN MEDICAL IMAGES

This application claims the benefit of U.S. Provisional Application No. 60/864,233, filed Nov. 3, 2006, the disclosure of which is herein incorporated by reference.

BACKGROUND OF THE INVENTION

The present invention relates to adaptive filtering, and more particularly, to adaptive filtering of medical images for simultaneous noise reduction and structure enhancement.

Adaptive filtering in image processing refers to self-adapting methods which adjust intensities of pixels in an image by integrating and weighting the intensities of neighboring pixels according to local structures in the image. Such methods may be used in medical imaging to improve image quality of raw image data. In order to improve image quality in medical images, it is desirable to mitigate noise resulting from image acquisition devices and to simultaneously enhance important structures in the medical images. It is important that adaptive filtering techniques completely preserve diagnostic patterns or structures in an image without generating artifacts or noise of any kind due to the filtering process, so that no pathological information is lost or created in the image.

Many convention adaptive filtering techniques utilize edge preserving noise suppression, or so-called "denoising" methods. Such denoising methods include, wavelet coefficient thresholding/shrinkage, variational methods, Bayesian framework with Markov random filed model, and bilateral filtering. However, while these methods are capable of reducing noise in images, they do not enhance structures in the images. Although methods have been introduced for simultaneous noise reduction and structure enhancement, these methods are either unsuitable for medical applications or too computationally intensive to meet real-time requirements.

BRIEF SUMMARY OF THE INVENTION

The present invention provides a method and system for adaptive filtering of medical images for simultaneous noise reduction and structure enhancement. Embodiments of the present invention perform image analysis to determine features that characterize each pixel of an image, and process each pixel using a filter type selected based on the features for that pixel.

In one embodiment of the present invention, an input image is decomposed into sub-band images using pyramid decomposition. Energy, orientation, and isotropy feature values can be determine for each pixel of each sub-band image. The energy feature value can be remapped in first and second energy values and the contrast of each pixel can be scaled based on the second energy value. A filter type can be selected for each pixel based on the first energy value for the pixel. If the first energy value for a pixel is greater than a threshold value, the pixel can be filtered using local bilateral filtering. If the first energy value for a pixel is not greater than a threshold value, an oriented Gaussian kernel can be selected based on the orientation and isotropy feature values for the pixel and the pixel can be filtered using the oriented Gaussian kernel.

These and other advantages of the invention will be apparent to those of ordinary skill in the art by reference to the following detailed description and the accompanying drawings.

DETAILED DESCRIPTION

The present invention is directed to a method for adaptive filtering of medical images for simultaneous noise reduction and structure enhancement. Embodiments of the present invention are described herein to give a visual understanding of the adaptive filtering method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. For example, according to various embodiments of the present invention, electronic data representing a medical image is manipulated within a computer system.

According to an embodiment of the present invention, the adaptive filtering method performs image analysis on a medical image in order to determine features that characterize the image. Based on the features, a filter type is determined separately for each pixel in the image, and each pixel is processed according to the filter type determined for that pixel.

Figure 1:
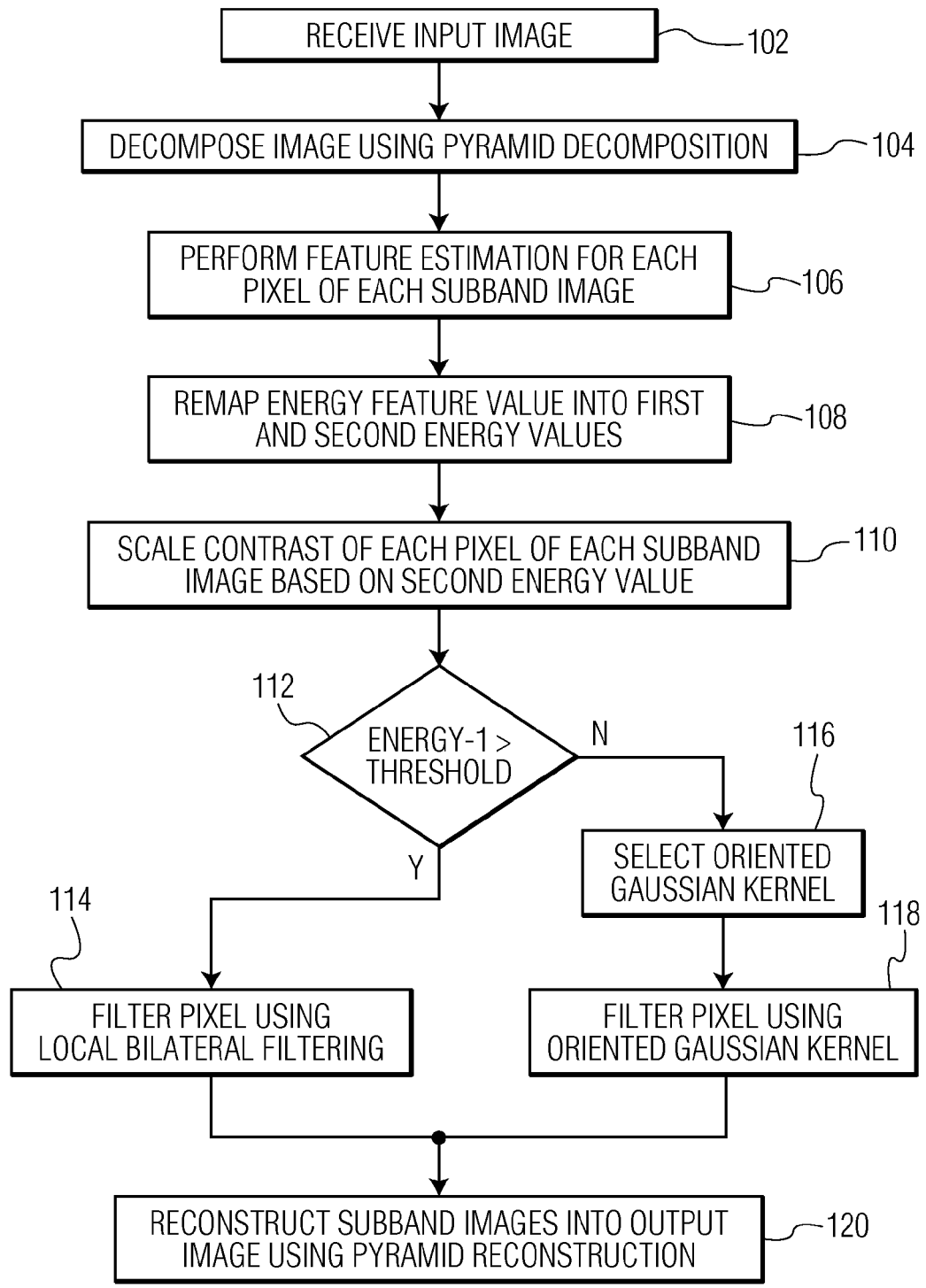
FIG. 1 illustrates a method for adaptive filtering of an image according to an embodiment of the present invention.

FIG. 1 illustrates a method for adaptive filtering of a medical image according to an embodiment of the present invention. At step 102, an input image is received. The input image is a medical image, such as an X-ray image, magnetic resonance (MR) image, computed tomography (CT) image, etc. The input image can be received from an image acquisition device or can be previously stored in memory or storage of a computer system.

At step 104, the input image is decomposed into a pyramid structure using pyramid decomposition. Pyramid decomposition partitions the input image into multiple sub-band images, each corresponding sub-band image corresponding to a frequency band. Accordingly, each sub-band image is a bandpass version of the input image for the corresponding frequency band. There are many well known techniques for pyramid decomposition, such as variations of wavelet transforms. According to an advantageous embodiment of the present invention, a Laplacian pyramid can be used. Pyramid decomposition using a Laplacian pyramid is described in greater detail in P. J. Burt et al., "The Laplacian Pyramid as a Compact Image Code," *IEEE Transactions on Communications*, vol. COM-31, 4, pp. 532-540, 1983.

At step 106, feature estimation is performed for each pixel of each of the sub-band images in order to identify local image characteristics at each pixel. In order to perform feature estimation for each pixel, the intensity structure within a local window centered at each pixel is analyzed. According to an embodiment of the present invention, local frequency, bandwidth, and magnitude information can be analyzed in the frequency domain at each pixel, resulting in feature values of orientation, isotropy, and energy for each pixel. The energy feature value for a pixel represents the likelihood that the pixel is in a signal region, such as a target anatomic structure in the image. The orientation feature value represents the orientation of the structure in the neighborhood of the pixel, and the isotropy feature value represents the isotropy of the structure in the neighborhood of the pixel.

According to an embodiment of the present invention, the feature estimation used to determine the energy, orientation, and isotropy feature values for each pixel in each of the sub-band images can be based on minimizing a distance metric in the frequency domain. For such a feature estimation method, let f(x) and F(u) denote an image (i.e., a sub-band image resulting from step 104) and its Fourier transform, respectively. In the 2-dimensional case, $x=(x_1,x_2)$ and $u(u_1, u_2)$. Within a local neighborhood centered at x, if it is assumed that the signal direction in the Fourier spectrum is denoted by s and the unit vector that is perpendicular to s is $s_p$, a cost function can be expressed as:

$$\epsilon(s_p) = \iint |W(u)|^2 d_p^2(u) |F(u)|^2 du, \quad (1)$$

where $$d_p^2(u) = (u \cdot s_p)^2 = (s_p^T u)(u^T s_p) = s_p^T (uu^T) s_p, \quad (2)$$

is a real-valued function which gives the shortest Euclidean distance between a point u and a line that is perpendicular to $s_p$; W(u) is a weighting function (e.g., a Gaussian function) that can be designed a priori according to different applications; and T denotes matrix transpose. Expanding (1) based on (2), the following expression can be obtained:

$$\epsilon(s_p) = \iint |W(u)|^2 s_p^T (uu^T) s_p |F(u)|^2 du = s_p^T \Phi s_p. \quad (3)$$

Here, $\Phi$ is a 2×2 real, symmetric, and positive semi-definite matrix, expressed as:

$$\Phi = \iint |W(u)|^2 (uu^T) |F(u)|^2 du. \quad (4)$$

Applying Plancherel's theorem (also referred to as the generalized Parseval's theorem) and the fact that differentiation in the spatial domain corresponds to multiplication by the respective coordinate in the frequency domain, each element $\Phi_{ij}$, i, j=1, 2, in $\Phi$ can be calculated from the image gradients as follows:

$$\Phi_{ij} = c \int \int_R \left( \frac{\partial f  w}{\partial x_i} \right) \left( \frac{\partial f  w}{\partial x_j} \right) dx_i dx_j, \quad (5)$$

where c is a constant scalar; R is the domain where integration is performed; $w(x_1,x_2)$ is the kernel coefficients of the predesigned fitter kernel W(u); and ** denotes 2D convolution.

The energy, orientation, and isotropy features can be determined based on $\Phi$. In order to simplify notation, $\Phi$ can be denoted as:

$$\Phi = \begin{bmatrix} a & d \\ d & b \end{bmatrix}.$$

Using the well known Jacobi algorithm. The orientation feature value is the signal direction, which can be calculated as:

$$\theta(x) = \frac{1}{2} \tan^{-1}\left( \frac{2d}{b-a} \right). \quad (6)$$

Let $\lambda_1$ and $\lambda_2$ denote the larger and smaller eigenvalues of $\Phi$, respectively. The signal anisotropy A(x) and signal energy function (energy feature value) E(x) are respectively defined as:

$$A(x) = \left( \frac{\lambda_1 - \lambda_2}{\lambda_1 + \lambda_2} \right), \quad (7)$$

and $$E(x) = \sqrt{\lambda_1 + \lambda_2}. \quad (8)$$

The isotropy feature value is defined as I(x)=1−A(x). $\lambda_1$ represents the signal strength along the direction in which the majority of spectral energy is concentrated, and $\lambda_2$ represents the signal strength in the direction perpendicular o that of $\lambda_1$. If the anisotropy measure A(x) is considered to parameterize an ellipse, the numerator in equation (7) captures the difference between the two principal axes of the ellipse and the denominator in equation (7) controls the size of the ellipse. The energy E(x) indicates the likelihood that each pixel is in a signal region (e.g., a target anatomic structure) or a noise region. If both of the principle axes are large, the energy E(x) will be large, indicating a high probability that a pixel represents a strong signal. If E(x) is small for a pixel, the pixel can be considered noise.

Figure 2:
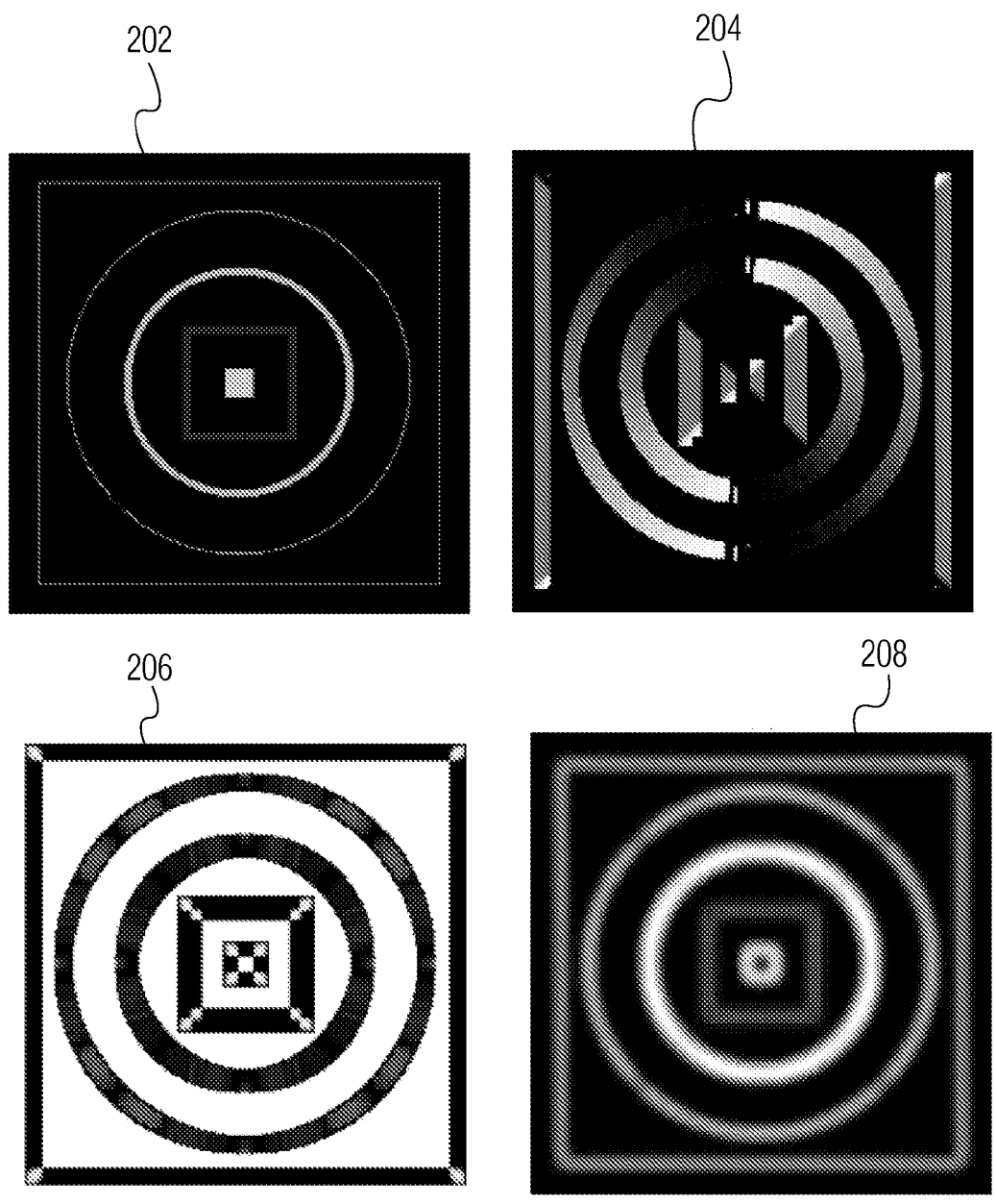
FIG. 2 illustrates orientation, isotropy, and energy feature maps for an exemplary image.

The feature estimation of step 106 generates feature maps for each of the orientation, isotropy, and energy feature values. FIG. 2 illustrates orientation, isotropy, and energy feature maps for an exemplary image. As illustrated in FIG. 2, image 202 is an input image, image 204 is an orientation feature map for image 202, image 206 is an isotropy feature map for image 202, and image 208 is an energy feature for image 202. In each of image 204, 206, and 208, the values of the feature shown are normalized so that a maximum feature value corresponds to a gray value of 255. Comparing images 202 and 204, it can be seen that circles in the input image 204 have an intensity value of 0 in the orientation feature map 204 at 0 degrees, and intensity value increases to a maximum of 255 as the circle approaches 180 degrees. In addition, horizontal lines in squares in the input image 202 have a value of 0 in the orientation feature map 204 and vertical lines in the input image 202 have values close to 128, which corresponds to 90 degrees. As illustrated in the isotropy feature map 206, low intensity circles and squares, implying that these structures have small isotropy values, correspond to the locations of such structures in the input image 202. As illustrated in the energy feature map 208, the circles and squares of the input image 202 have high energy, and are thus considered important structures. Although a possible method for feature estimation is described above, the present invention is not limited to the above described method for feature estimation.

Figure 3:
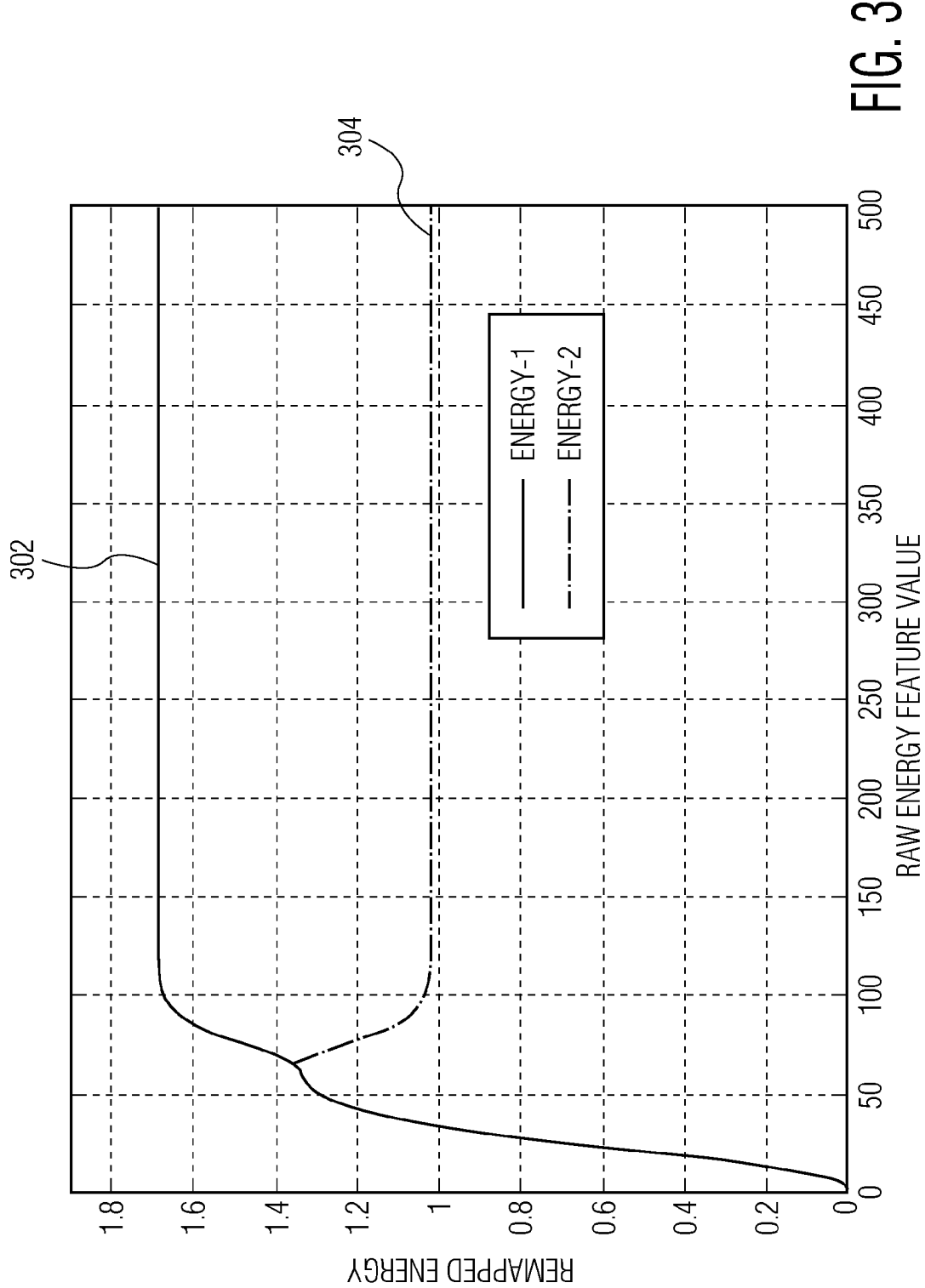
FIG. 3 illustrates remapping curves for assigning first and second energy values based on a raw energy feature value.

Returning to FIG. 1, at step 108, the energy feature value for each pixel is remapped into first and second energy values. The scale of the raw energy feature value calculated in step 106 is dependent upon adopted gradient filters, such as Sobel filter, or derivative Gaussian filters. Accordingly, the energy feature value can be remapped in order to guide the adaptive filtering. According to an embodiment of the present invention, the energy feature value can be remapped based on histogram specification, which is a well known procedure for transforming a histogram into a target distribution. Such a remapping method utilizes two remapping curves to assign the first and second energy values (energy-1 and energy-2) to each pixel based on the raw energy feature value. FIG. 3 illustrates remapping curves for assigning the first and second energy values based on the raw energy feature value. As illustrated in FIG. 3, a first energy remapping curve 302 is used to determine energy-1 based on the raw energy feature value, and a second remapping curve is used to determine energy-2 based on the raw energy feature value. The first energy remapping curve 302 monotonically increases with respect to raw energy feature value, and the second remapping curve 304 levels off after a certain peak value. The first and second energy remapping curves 302 and 304 can be achieved by a mixture of two Gaussian functions.

Returning to FIG. 1, at step 110, each of the sub-band images is scaled to enhance or suppress the contrast of each pixel based on the second energy value (energy-2) of each pixel. When energy-2 for a pixel is greater than 1, the pixel is considered a signal pixel and the contrast of the pixel is increased. When energy-2 for a pixel is less than 1, the pixel is considered noise and the contrast of the pixel is reduced. On possible way to manipulate the contrast of an image in order to reduce or increase the contrast at each pixel is to use a lowpass or bandpass filter kernel in the local neighborhood of each pixel. Since each sub-band image is a bandpass signal by nature, it is possible to directly multiply the second energy value (energy-2) by the value of the sub-band for each pixel. This is referred to a bandpassing scaling, and the contrast adjustment is achieved after pyramid reconstruction. Bandpass scaling is advantageous in that it requires a minimal amount of computation to adjust the contrast. Also, multi-resolution denoising and enhancement is achieved using bandpass scaling without any impact from neighboring pixels in each sub-band image, thus minimizing the possibility to generate spurious artifacts when structures are present in the neighborhood of a pixel. As the Laplacian pyramid partitions the frequency plane in an isotropic manner, there is essentially no oriented processing for the bandpass scaling. However, an image processed with bandpass scaling may appear abrupt unless the image is smoothed along the edges. Therefore, the bandpass scaling is followed by additional adaptive filtering according to an embodiment of the present invention.

At step 112, it is determine whether the first energy value (energy-1) for each pixel of each sub-band image is greater than a threshold value. This step selects a filter type to filter each pixel based on the energy-1 value for each pixel. If energy-1 is greater than the threshold value for a pixel, a first filter type is selected for the pixel and the method proceeds to step 114. According to an embodiment of the present invention, the first filter type can be a local bilateral filter. If energy-1 is not greater than the threshold value for a pixel, a second filter type is selected and the method proceeds to step 116. According to an embodiment of the present invention, the second filter type can be an oriented Gaussian filter. Although FIG. 1 illustrates adaptive filtering using a bilateral filter and an oriented Gaussian filter, the present invention is not limited thereto, and other filter types may be utilized as well.

At step 114, a current pixel is filtered using local bilateral filtering. When energy-1 is greater than the threshold value for a pixel, this indicates a high probability of a strong structure in the neighborhood of the pixel. For such strong structures, any fixed kernel weighted average may lead to image artifacts. Local bilateral filtering for the pixel is a suitable way to filter the pixel while preventing the generation of any artifact. Local bilateral filtering takes spatial distances as well as the intensity differences into account for determining an appropriate weighting scheme for adaptive filtering. Local bilateral filtering is well known, for example, one possible method for local bilateral filtering is described in C. Tomasi et al., "Bilateral Filtering for Gray and Color Images," in *Proceedings of IEEE International Conf. on Computer Vision*, Bombay, India, 1998.

Figure 4:
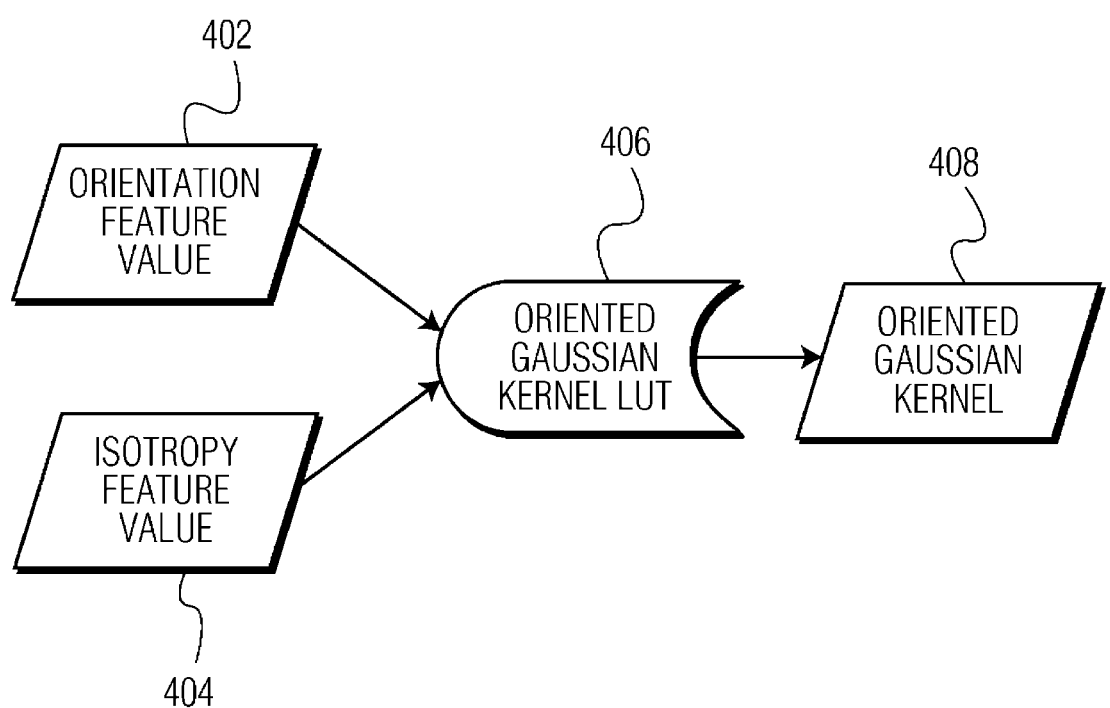
FIG. 4 illustrates selection of an oriented Gaussian kernel according to an embodiment of the present invention.

At step 116, an oriented Gaussian kernel is selected for a current pixel. When energy-1 is below the threshold value, an efficient orient Gaussian kernel can be used to smooth edges. The Gaussian kernel can be selected from a look-up table (LUT) based on the orientation and isotropy feature values for the current pixel. FIG. 4 illustrates the selection of the Gaussian kernel according to an embodiment of the present invention. As illustrated in FIG. 4 the orientation feature value 402 and the isotropy feature value 404 are input to an oriented Gaussian kernel LUT 406. The oriented Gaussian kernel LUT 406 selects an oriented Gaussian kernel 408 based on the input orientation and isotropy feature values 402 and 404, and outputs the oriented Gaussian kernel 408. The oriented Gaussian kernel LUT 406 can include Gaussian kernels with all possible directions and bandwidths, and can be designed in advance of the filtering operation. The oriented Gaussian kernel LUT 406 selects an oriented Gaussian kernel 408 having a direction corresponding to the orientation feature value 402 and a bandwidth corresponding to the isotropy feature value 404.

Returning to FIG. 1, at step 118, the current pixel is filtered using the oriented Gaussian kernel selected in step 116. Accordingly, the current pixel is directionally Gaussian filtered based on the orientation and isotropy feature values.

At step 120, after each pixel in the sub-band images is either bilaterally filtered or directionally Gaussian filtered, the filtered sub-band images are reconstructed into an output image using pyramid reconstruction. There are many well known pyramid reconstruction techniques that can be used to reconstruct an image from the filtered sub-band images. In the output image, structures are enhanced and noise is reduced by the bandpass scaling and filtering steps in the above described method.

Figure 5B:
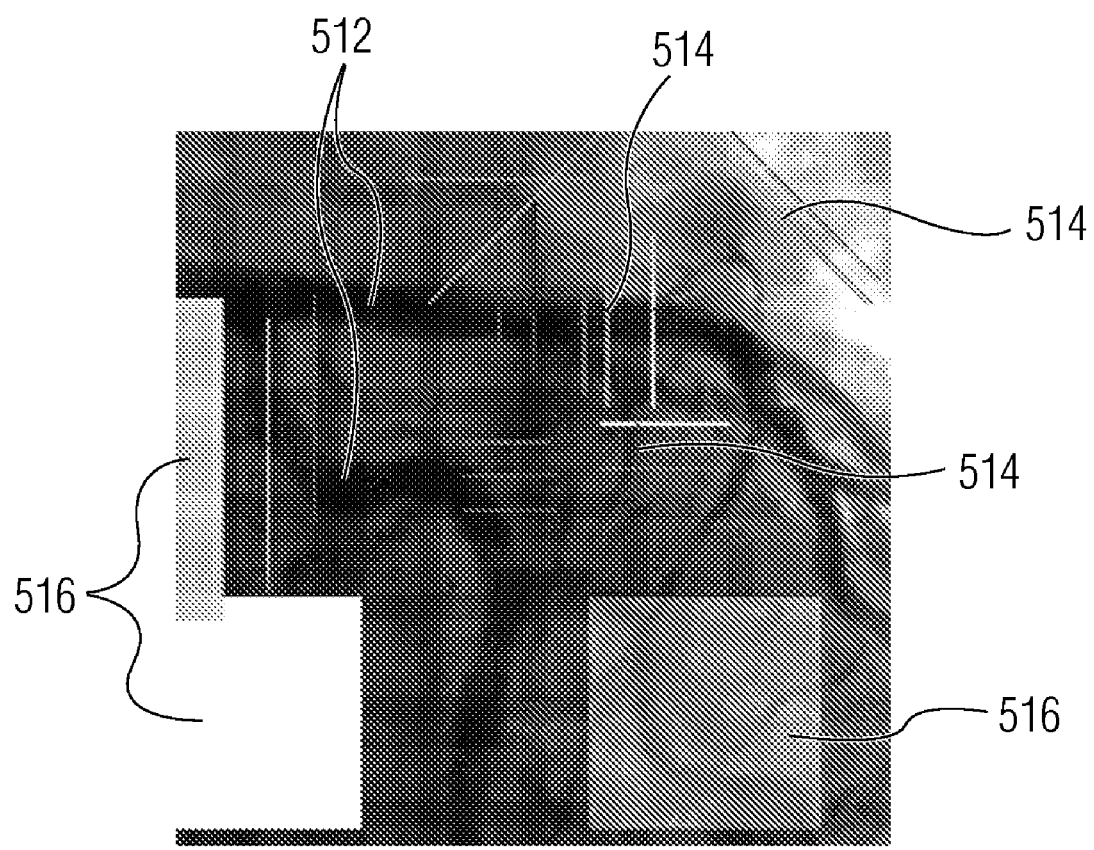
FIG. 5 illustrates exemplary results of the adaptive filtering method applied to an X-ray image.
Figure 5C:
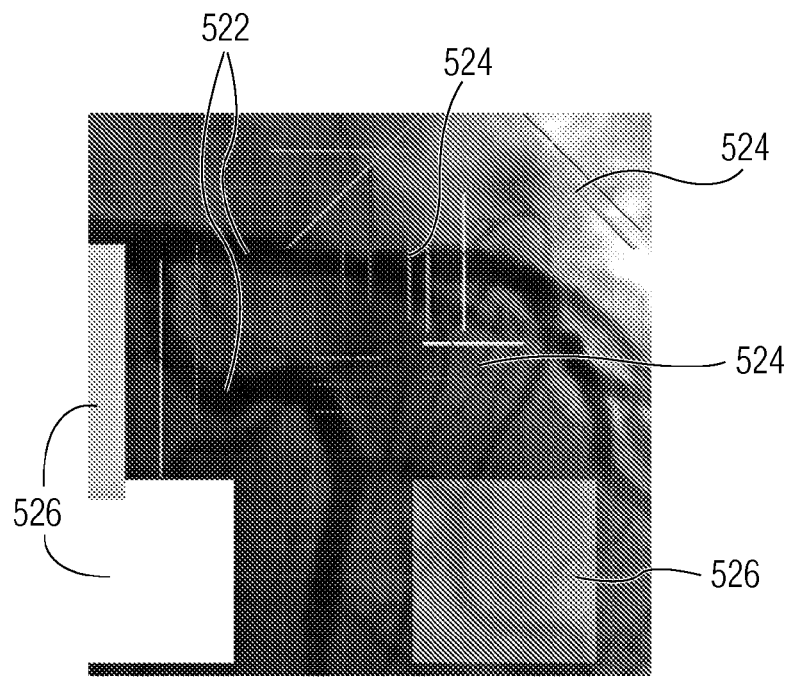
Figure 5D:
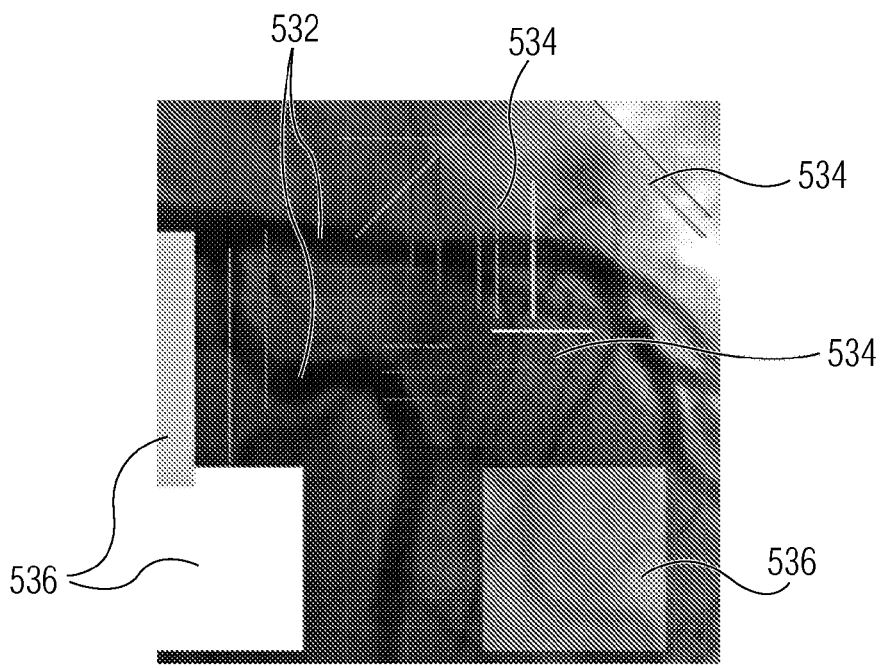

FIG. 5 illustrates exemplary results of the above-described adaptive filtering method applied to an X-ray image. As illustrated in FIG. 5, image (a) shows an X-ray image containing vessels 502 and artificial lines 504 and boxes 506 having different intensities. Image (b) shows results of conventional filtering by a combination of lowpass and an adaptive bandpass filter. Image (c) shows results of the above-described method including local bilateral filtering and oriented Gaussian filtering according to an embodiment of the present invention. Image (d) shows the results of an embodiment of the present invention without local bilateral filtering. In image (b) artifacts can be seen along the artificial lines 514 and boxes 516, especially those with high contrast. Furthermore, the vessels 512 are enhanced, but the background noise and the artificial lines 514 and boxes are not reduced. In images (c) and (d), the artifacts around the artificial lines 524 and 534 and boxes 526 and 536 are eliminated. As shown in images (c) and (d), the vessels 522 and 532 are enhanced and the background noise and artificial lines 524 and 534 and boxes 526 and 536 are reduced.

Figure 6:
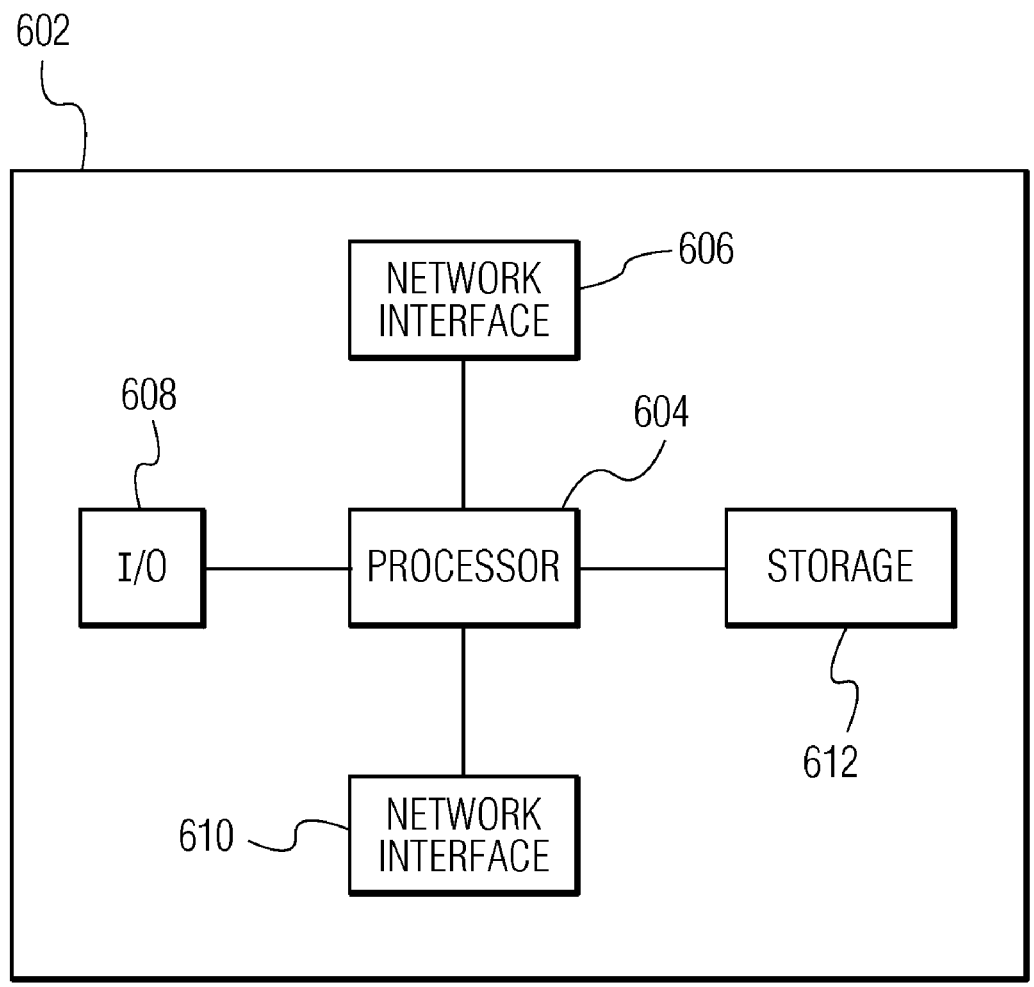
FIG. 6 is a high level block diagram of a computer capable of implementing the present invention.

The above described adaptive filtering method for simultaneous structure enhancement and noise reduction can be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, applications for performing the above described method steps can be defined by the computer program instructions stored in the memory 610 and/or storage 612 and controlled by the processor 604 executing the computer program instructions. Furthermore, image data corresponding to the input and output images and the sub-band images can be stored in the memory 610 and/or the storage 612. An image acquisition device 620 can be connected to the computer 602 to medical images to the computer 602. It is possible to implement the MR scanning device and the computer 602 as one device. It is also possible the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for enhancing images, comprising:
   determining an energy feature value, an orientation feature value, and an isotropy feature value for a plurality of pixels in a plurality of sub-band images of an input image;
   remapping said energy feature value for each pixel in each of said plurality of sub-band images into first and second energy values based on a first energy remapping curve that monotonically increases with respect to the energy feature value and a second energy remapping curve that levels off after a peak value of the energy feature value, respectively;
   scaling a contrast of each pixel in each of said plurality of sub-band images based on the second energy value for each pixel;
   selecting a filter type for each of said plurality of pixels based on said first energy value determined for each of said plurality of pixels; and
   filtering each of said plurality of pixels using the filter type selected for each of said plurality of pixels.

2. The method of claim 1, further comprising:
   decomposing said input image into the plurality of sub-band images using pyramid decomposition prior to said step of determining an energy feature value, an orientation feature value, and an isotropy feature value.

3. The method of claim 2, wherein said step of decomposing said input image comprises:
   decomposing said input image into the plurality of sub-band images using Laplacian pyramid decomposition, wherein each of said plurality of sub-band images is a bandpass representation of said input image.

4. The method of claim 1, wherein said step of determining an energy feature value, an orientation feature value, and an isotropy feature value comprises:
   determining an energy feature value, an orientation feature value, and an isotropy feature value for each pixel in each of said plurality of sub-band images by minimizing a distance metric in a frequency domain.

5. The method of claim 1, wherein said step of scaling a contrast of each pixel in each of said plurality of sub-band images based on the second energy value for each pixel comprises:
   reducing the contrast of a pixel when the second energy value for the pixel is less than one; and
   increasing the contrast of pixel when the second energy value for the pixel is greater than one.

6. The method of claim 1, wherein said step of scaling a contrast of each pixel in each of said plurality of sub-band images based on the second energy value for each pixel comprises:
   multiplying the second energy value for each pixel in each of said plurality of sub-band images by a sub-band value of the sub-band image of the pixel.

7. The method of claim 1, wherein said step of selecting a filter type comprises:
   comparing the first energy value for each pixel to a threshold value;
   when the first energy value for a pixel is greater than said threshold value, selecting a first filter type to filter the pixel; and
   when the first energy value is not greater than said threshold value, selecting a second filter type to filter the pixel.

8. The method of claim 7, wherein said first filter comprises a local bilateral filter and said second filter comprises an oriented Gaussian filter.

9. The method of claim 8, wherein said step of filtering each of said plurality of pixels comprises:
   when said local bilateral filter is selected for a pixel, filtering the pixel using local bilateral filtering; and
   when said oriented Gaussian filter is selected for a pixel, selecting an oriented Gaussian kernel based on the orientation and isotropy feature values for the pixel, and filtering the pixel using said oriented Gaussian kernel.

10. The method of claim 9, wherein said step of selecting an oriented Gaussian kernel based on the orientation and isotropy feature values for the pixel comprises:
    inputting the orientation and isotropy feature values to an oriented Gaussian kernel look-up table (LUT); and
    selecting an oriented Gaussian kernel having a direction corresponding to the orientation feature value and a bandwidth corresponding to said isotropy feature value from said oriented Gaussian kernel LUT.

11. The method of claim 7, further comprising:
    reconstructing said plurality of sub-band images into an image using pyramid reconstruction after each pixel in each of said plurality of sub-band images is filtered.

12. The method of claim 1, further comprising:
    displaying a filtered image generated by filtering each of said plurality of pixels.

13. An apparatus enhancing images, comprising:
    means for determining an energy feature value, an orientation feature value, and an isotropy feature value for a plurality of pixels in a plurality of sub-band images of an input image;
    means for remapping said energy feature value for each pixel in each of said plurality of sub-band images into first and second energy values based on a first energy remapping curve that monotonically increases with respect to the enemy feature value and a second energy remapping curve that levels off after a peak value of the energy feature value, respectively;

means for scaling a contrast of each pixel in each of said plurality of sub-band images based on the second energy value for each pixel means for selecting a filter type for each of said plurality of pixels based on said first energy value determined for each of said plurality of pixels; and means for filtering each of said plurality of pixels using the filter type selected for each of said plurality of pixels.

14. The apparatus of claim 13, further comprising:
means for decomposing said input image into the plurality of sub-band images using pyramid decomposition.

15. The apparatus of claim 14, wherein said means for determining at least one feature value comprises:
means for determining an energy feature value, an orientation feature value, and an isotropy feature value for each pixel in each of said plurality of sub-band images by minimizing a distance metric in a frequency domain.

16. The apparatus of claim 13, wherein:
said means for selecting a filter type comprises:
means for comparing the first energy value for each pixel to a threshold value; and
said means for filtering each of said plurality of pixels comprises:
means for filtering a pixel using local bilateral filtering when the first energy value for the pixel is greater then said threshold value; and
means for selecting an oriented Gaussian kernel based on the orientation and isotropy feature values for a pixel and filtering the pixel using said oriented Gaussian kernel when the first energy value for the pixel is not greater than said threshold.

17. The apparatus of claim 16, further comprising:
means for reconstructing said plurality of sub-band images into an image using pyramid reconstruction.

18. A non-transitory computer readable medium encoded with computer executable instructions for enhancing images, the computer executable instructions defining steps comprising:
determining an energy feature value, an orientation feature value, and an isotropy feature value for a plurality of pixels in a plurality of sub-band images of an input image;
remapping said energy feature value for each pixel in each of said plurality of sub-band images into first and second energy values based on a first energy remapping curve that monotonically increases with respect to the energy feature value and a second energy remapping curve that levels off after a peak value of the energy feature value, respectively;
scaling a contrast of each pixel in each of said plurality of sub-band images based on the second energy value for each pixel;
selecting a filter type for each of said plurality of pixels based on said first energy value determined for each of said plurality of pixels; and
filtering each of said plurality of pixels using the filter type selected for each of said plurality of pixels.

19. The non-transitory computer readable medium of claim 18, further comprising computer executable instructions defining the step of:
decomposing said input image into the plurality of sub-band images using pyramid decomposition prior to said step of determining an energy feature value, an orientation feature value, and an isotropy feature value; and
reconstructing said plurality of sub-band images into an image using pyramid reconstruction after said step of filtering each of said plurality of pixels using the filter type selected for each of said plurality of pixels.

20. The non-transitory computer readable medium of claim 19, wherein the computer executable instructions defining the step of determining an energy feature value, an orientation feature value, and an isotropy feature value comprise computer executable instructions defining the step of:
determining an energy feature value, an orientation feature value, and an isotropy feature value for each pixel in each of said plurality of sub-band images by minimizing a distance metric in a frequency domain.

21. The non-transitory computer readable medium of claim 18, wherein:
the computer executable instructions defining the step of selecting a filter type comprise computer executable instructions defining the step of:
comparing the first energy value for each pixel to a threshold value; and
the computer executable instructions defining the step of filtering each of said plurality of pixels comprises:
when the first energy value for a pixel is greater than said threshold value, filtering the pixel using local bilateral filtering; and
when the first energy value for a pixel is not greater than said threshold value, selecting an oriented Gaussian kernel based on the orientation and isotropy feature values for the pixel and filtering the pixel using said oriented Gaussian kernel.

* * * * *